US012744731B2

(12) United States Patent
Wu et al.

(10) Patent No.: US 12,744,731 B2
(45) Date of Patent: Sep. 22, 2026

(54) MESSAGE FORWARDING METHOD AND APPARATUS, AND STORAGE MEDIUM AND ELECTRONIC DEVICE

(71) Applicant: ZTE Corporation, Shenzhen (CN)

(72) Inventors: Haisheng Wu, Shenzhen (CN); Chaofeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 312 days.

(21) Appl. No.: 18/568,987

(22) PCT Filed: Jun. 10, 2022

(86) PCT No.: PCT/CN2022/098232
§ 371 (c)(1),
(2) Date: Dec. 11, 2023

(87) PCT Pub. No.: WO2023/273842
PCT Pub. Date: Jan. 5, 2023

(65) Prior Publication Data
US 2024/0275721 A1 Aug. 15, 2024

(30) Foreign Application Priority Data
Jun. 30, 2021 (CN) ......................... 202110742303.0

(51) Int. Cl.
*H04L 45/50* (2022.01)
*H04L 45/121* (2022.01)

(52) U.S. Cl.
CPC ............ *H04L 45/50* (2013.01); *H04L 45/121* (2013.01)

(58) Field of Classification Search
CPC .. H04B 7/185; H04B 7/18508; H04B 7/1851; H04B 7/18521; H04B 7/18523;
(Continued)

(56) References Cited

U.S. PATENT DOCUMENTS 6,473,421 B1 10/2002 Tappan
2016/0057004 A1* 2/2016 Ge .......................... H04W 4/70 370/254
2019/0190821 A1* 6/2019 Van Wambeke ........ H04L 45/50

FOREIGN PATENT DOCUMENTS

CN 103825818 A 5/2014
CN 105471734 A 4/2016
(Continued)

OTHER PUBLICATIONS

Yan et al., An Advanced Leo Satellite Network Model Based on MPLS-TP, Jan. 20, 2011, IEEE, 5 pages.*
(Continued)

*Primary Examiner* — Frank Duong
(74) *Attorney, Agent, or Firm* — CANTOR COLBURN LLP

(57) ABSTRACT

Provided are a packet forwarding method and apparatus, and a storage medium and an electronic device. The method includes: looking up an ingress label of a packet to be forwarded in a current label forwarding table corresponding to a current time slice or current topology in a case that the packet to be forwarded is acquired; looking up the ingress label in a target label forwarding table corresponding to a target time slice or target topology in a case that the ingress label is not found in the current label forwarding table; and forwarding the packet to be forwarded according to an egress label corresponding to the ingress label in the target label forwarding table in a case that the ingress label is found in the target time slice. By the present disclosure, the problem of packet forwarding failure is solved, thereby achieving an effect of improving the packet forwarding efficiency.

16 Claims, 6 Drawing Sheets

(58) Field of Classification Search
CPC .. H04B 7/1853; H04B 7/18578; H04B 7/204; H04L 45/121; H04L 45/16; H04L 45/24; H04L 45/50; H04L 45/505; H04L 45/507; H04L 45/52; H04L 45/54; H04L 45/74; H04L 45/745; H04L 49/602; H04W 40/02
See application file for complete search history.

(56) References Cited

FOREIGN PATENT DOCUMENTS

| | | | |
|---|---|---|---|
| CN | 110601975 | A | 12/2019 |
| CN | 110493132 | B | 5/2021 |

OTHER PUBLICATIONS

European Search Report for corresponding application EP22831662; Mail date Sep. 27, 2024.
International Search Report for corresponding application PCT/CN2022/098232 filed Jun. 10, 2022; Mail date Aug. 2, 2022.

* cited by examiner

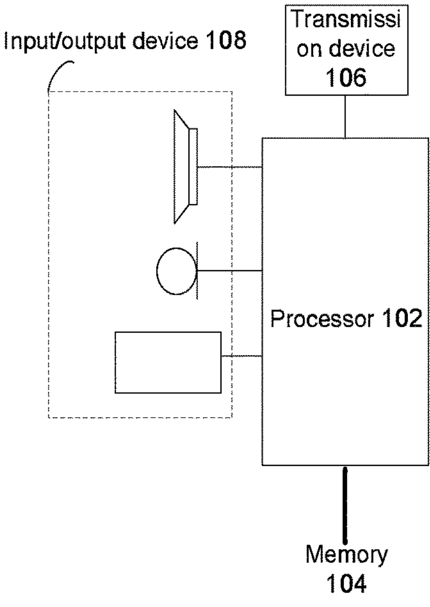
Fig. 1
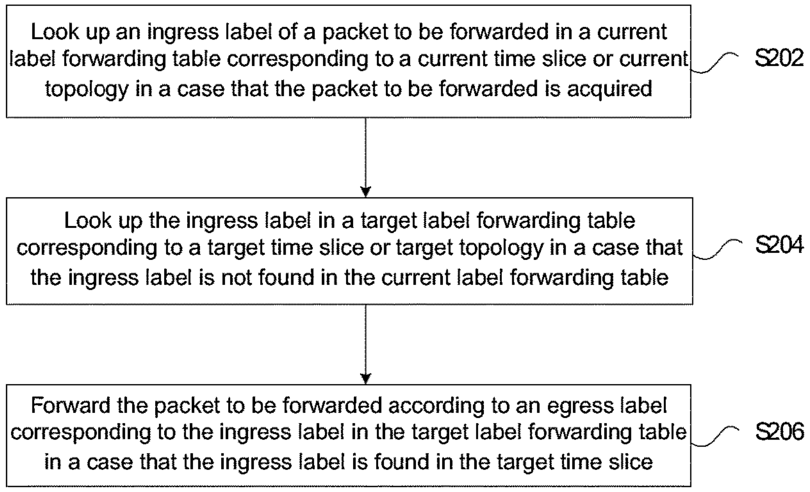
Fig. 2
| | | | 1 bit | |
|---|---|---|---|---|
| Time slice ID | Label value | EXP | S | TTL |
| 8 bits | 12 bits | 3 bits | | 8 bits |
Fig. 3

Part 1:Label forwarding table of current topology

| In-label | Out-label | Out-interface | NH |
|---|---|---|---|
| 02:2000 | 02:2001 | fei_2-1 | 10.2.1.1 |
| 02:2010 | 02:2011 | fei_2-2 | 10.2.2.1 |
| 02:2020 | 02:2021 | fei_2-3 | 10.2.3.1 |
| 02:2030 | 02:2031 | fei_2-4 | 10.2.4.1 |
| ...... | ...... | ...... | ...... |

Part 2:Label forwarding table ofmapping topology

| In-label | Out-label | Out-interface | NH |
|---|---|---|---|
| 01:510 | 02:2001 | fei_2-1 | 10.2.1.1 |
| 01:520 | 02:2011 | fei_2-2 | 10.2.2.1 |
| 01:530 | 02:2021 | fei_2-3 | 10.2.3.1 |
| 01:540 | 02:2031 | fei_2-4 | 10.2.4.1 |
| ...... | ...... | ...... | ...... |

| Ingress label | NH Next hop | FEC Equivalent forwarding table |
| --- | --- | --- |
| 01:1010 | R3 | D |

15
01:1010
01:1020
01:1030
IP packet 15
02:2020
02:2030
IP packet

R1 R2 R3 D R4 R5 E

01:1010
02:2020
02:2030

15
02:2030
IP packet

| In-label | NH Next hop | FEC Equivalent forwarding table |
| --- | --- | --- |
| 01:1010 | R3 | D |

MESSAGE FORWARDING METHOD AND APPARATUS, AND STORAGE MEDIUM AND ELECTRONIC DEVICE

CROSS-REFERENCE TO RELATED APPLICATION

This disclosure is based upon and claims priority to Chinese Patent Application CN202110742303.0 filed on Jun. 30, 2021 and entitled "Packet forwarding method and apparatus, and storage medium and electronic device", the disclosure of which is hereby incorporated by reference in its entirety.

TECHNICAL FIELD

Embodiments of the present disclosure relate to the field of communications, and in particular, to a packet forwarding method and apparatus, and a storage medium and an electronic device.

BACKGROUND

In a related art, during satellite routing forwarding, topology changes frequently. Therefore, when a packet received by one node in one time period reaches a next node, a time slot has been adjusted to a next time period. Therefore, a corresponding label may not be found on the next node and cannot be forwarded, and the packet is discarded.

SUMMARY

Embodiments of the present disclosure provide a packet forwarding method and apparatus, and a storage medium and an electronic device to at least solve the problem of packet forwarding failure in a related technology.

According to one embodiment of the present disclosure, a packet forwarding method is provided, which may include: an ingress label of a packet to be forwarded is searched in a current label forwarding table corresponding to a current time slice or current topology in a case that the packet to be forwarded is acquired: the ingress label is searched in a target label forwarding table corresponding to a target time slice or target topology in a case that the ingress label is not found in the current label forwarding table; and the packet to be forwarded is forwarded according to an egress label corresponding to the ingress label in the target label forwarding table in a case that the ingress label is found in the target time slice.

According to another embodiment of the present disclosure, a packet forwarding apparatus is provided, which may include: a first lookup unit, configured to search for an ingress label of a packet to be forwarded in a current label forwarding table corresponding to a current time slice or current topology in a case that the packet to be forwarded is acquired: a second lookup unit, configured to search for the ingress label in a target label forwarding table corresponding to a target time slice or target topology in a case that the ingress label is not found in the current label forwarding table; and a forwarding unit, configured to forward the packet to be forwarded according to an egress label corresponding to the ingress label in the target label forwarding table in a case that the ingress label is found in the target time slice.

According to still another embodiment of the present disclosure, a computer-readable storage medium is further provided. The computer-readable storage medium stores a computer program. The computer program is configured to perform steps in any one of the method embodiments when running.

According to still another embodiment of the present disclosure, an electronic apparatus is further provided, which may include a memory and a processor. The memory stores a computer program, and the processor is configured to run the computer program to perform steps in any one of the method embodiments.

Through the present disclosure, in a case that the packet to be forwarded is acquired, and the ingress label of the packet to be forwarded cannot be found in the current label forwarding table corresponding the current time slice or the current topology, the ingress label of the packet to be forwarded will be searched in the target label forwarding table of the target time slice or the target topology, and the packet is forwarded, and an in-packet will not be discarded directly. therefore, the problem of packet forwarding failure can be solved, and an effect of improving the packet forwarding efficiency can be achieved.

BRIEF DESCRIPTION OF THE DRAWINGS

FIG. 1 is a hardware environment diagram of a packet forwarding method according to an embodiment of the present disclosure.

FIG. 2 is a flowchart of a packet forwarding method according to an embodiment of the present disclosure.

FIG. 3 is a schematic diagram of a label of a packet forwarding method according to an embodiment of the present disclosure.

DETAILED DESCRIPTION OF THE EMBODIMENTS

Figure 4:
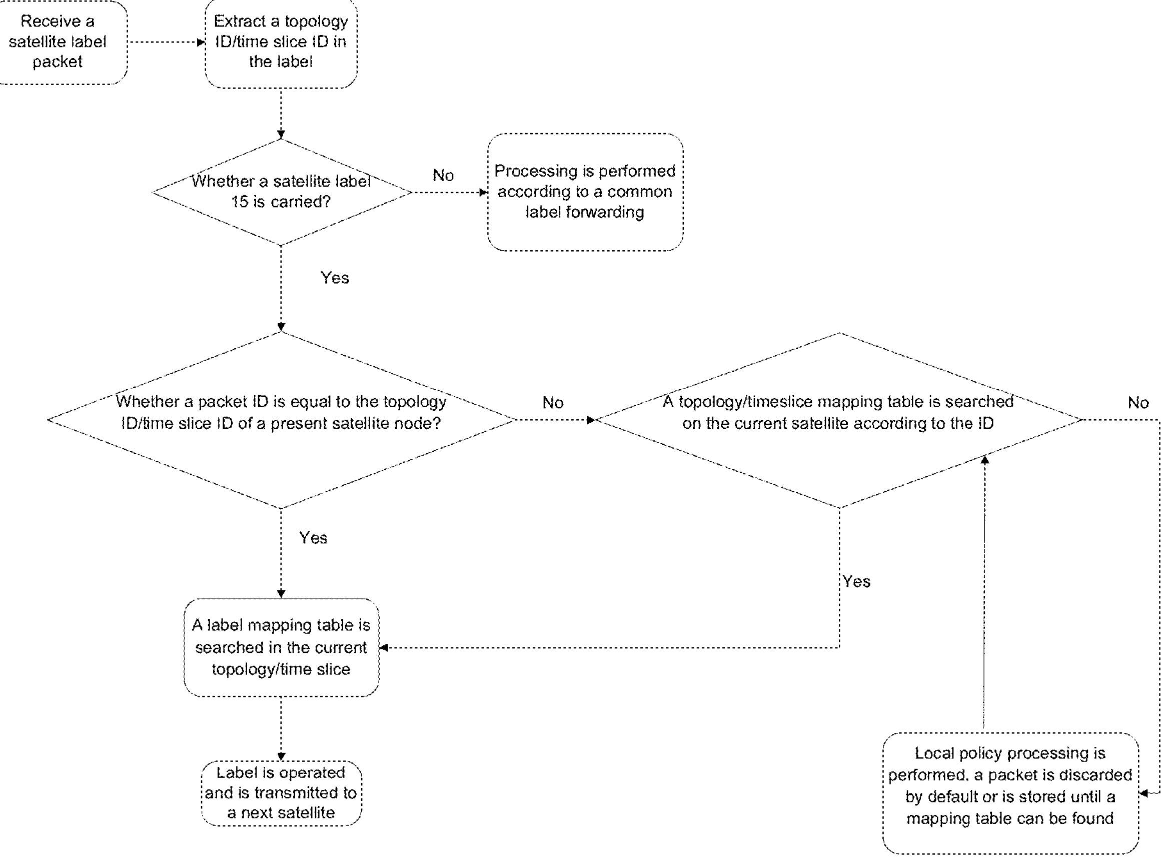
FIG. 4 is a flowchart of a packet forwarding method according to an embodiment of the present disclosure.

Embodiments of the present disclosure are described in detail below with reference to the drawings and in conjunction with the embodiments.

It is to be noted that the specification and claims of the present disclosure and the terms "first", "second" and the like in the drawings are used to distinguish similar objects, and do not need to describe a specific sequence or a precedence order.

The method embodiments provided in the embodiments of the present application may be executed in a mobile terminal, a computer terminal or a similar computing apparatus. Taking running on a mobile terminal as an example, FIG. 1 is a block diagram of a hardware structure of the mobile terminal of a packet forward method according to an embodiment of the present disclosure. As shown in FIG. 1, the mobile terminal may include one or more (only one shown in FIG. 1) processors 102 (the processors 102 may include, but are not limited to, processing apparatuses such as a Microprocessor Control Unit (MCU) or a Field Programmable Gate Array (FPGA)) and a memory 104 for storing data. The mobile terminal may also include a transmission device 106 for a communication function and an input/output device 108. Those of ordinary skill in the art may understand that the structure shown in FIG. 1 is only illustrative and does not limit the structure of the mobile terminal. For example, the mobile terminal may also include more or fewer components than those shown in FIG. 1, or has a different configuration from that shown in FIG. 1.

The memory 104 may be configured to store a computer program, for example, a software program of application software and modules, such as a computer program corresponding to a packet forwarding method in the embodiments of the present disclosure. The processor 102 executes various functional applications and data processing, that is, implements the method by running the computer program stored in the memory 104. The memory 104 may include a high speed random access memory or a non-volatile memory, for example, one or more magnetic storage apparatuses, flash memories, or other non-volatile solid state memories. In some embodiments, the memory 104 may further include memories remotely located relative to the processor 102. These remote memories may be connected to the mobile terminal through a network. Examples of the network include, but are not limited to, the Internet, the Intranet, a local area network, a mobile communication network, and combinations thereof.

The transmission device 106 is configured to receive or transmit data through a network. Specific examples of the network may include a wireless network provided by a communication provider of the mobile terminal. In one example, the transmission device 106 includes a Network Interface Controller (NIC) that can be connected to other network devices through a base station to communicate with the Internet. In one example, the transmission device 106 may be a Radio Frequency (called RF for short) module, which is configured to communicate with the Internet in a wireless manner.

A packet forwarding method is provided in the present embodiment. FIG. 2 is a flowchart of a packet forwarding method according to an embodiment of the present disclosure. As shown in FIG. 2, the flow includes the following steps.

At S202, looking up an ingress label of a packet to be forwarded in a current label forwarding table corresponding to a current time slice or current topology in a case that the packet to be forwarded is acquired.

At S204, looking up the ingress label in a target label forwarding table corresponding to a target time slice or target topology in a case that the ingress label is not found in the current label forwarding table.

At S206, forwarding the packet to be forwarded according to an egress label corresponding to the ingress label in the target label forwarding table in a case that the ingress label is found in the target time slice.

Optionally, in the present embodiment, the ingress label of the packet to be forwarded may be searched in the current label forwarding table corresponding to the current time slice or the current topology in a case that the packet to be forwarded is acquired. In a case that the ingress label is found, the packet to be forwarded may be forwarded according to the egress label corresponding to the ingress label in the current label forwarding table. In a case that the ingress label of the packet to be forwarded cannot be found in the current label forwarding table, it indicates that a time slot changes, the ingress label may be searched in the target label forwarding table corresponding to other time slot, that is, the target time slice or the target topology, and the packet to be forwarded may be forwarded through the egress label corresponding to the ingress label. The situation that the packet is discarded due to changes of the time slot is avoided.

As an optional example, before the packet to be forwarded is acquired, the method further includes the following operations.

A topological path corresponding to each time slice is calculated. All time slices have a mapping relationship, and each time slice corresponds to one topological path.

A label forwarding path corresponding to each time slice is obtained according to the topological path.

In the present embodiment, for each time slice, the corresponding topological path may be calculated, and the label forwarding path corresponding to each time slice may be obtained according to the topological path. The topological paths calculated according to different time slices may be the same or different. A previous node and a next node of each node are determined according to the topological path, and a label forwarding path is determined.

As an optional example, the step that the ingress label of the packet to be forwarded is searched in the current label forwarding table corresponding to the current time slice or the current topology in a case that the packet to be forwarded is acquired includes the following operations.

A target label of the packet to be forwarded is parsed.

The packet to be forwarded is determined as a common packet or a satellite packet according to the target label of the packet to be forwarded.

The ingress label is searched in the current label forwarding table in a case that the packet to be forwarded is the satellite packet.

Optionally, in the present embodiment, the target label may be added to the packet to be forwarded, and whether the packet to be forwarded is identified as the common packet or the satellite packet through the target label. If the target label identifies the packet to be forwarded as the satellite packet, the ingress label of the packet to be forwarded is searched. A target identifier may be different character strings to identify the packet to be forwarded as the common packet or the satellite packet.

As an optional example, before the target label of the packet to be forwarded is parsed, the method further includes the following operations.

It is determined that the packet to be forwarded includes the target label in a case that the packet to be forwarded is parsed to obtain a first packet. The first packet may, but is not limited to, be located before the target label, and the first packet may be, but is not limited to, 15.

It is determined that the packet to be forwarded does not include the target label in a case that the first packet is not obtained by parsing the packet to be forwarded.

Optionally, in the present embodiment, whether the packet to be forwarded includes the target label may be identified through one first packet. The first label may be a label that identifies a consumption duration or identifies less consumption resources. Whether the packet to be forwarded includes the target label may be quickly identified by identifying the first label. If the packet to be forwarded does not include the target label, it indicates that the packet to be forwarded is not the common packet or the satellite packet, and the packet to be forwarded is not forwarded.

As an optional embodiment, the step that the ingress label is searched in the target label forwarding table corresponding to the target time slice in a case that the ingress label is not found in the current label forwarding table includes the following operations.

M−1 time periods are waited in a case that the target time slice is not found. Each time period is a time slice, and M is the number of time slices in a cycle.

The target time slice is searched after waiting for M−1 time periods.

The ingress label is searched in the target label forwarding table in a case that the target time slice is found.

The forwarding of the packet to be forwarded is ended up in a case that the target time slice is not found.

In the present embodiment, the M is the number of time slices in a cycle. For example, one cycle has five time slices, and each time slice corresponds to a target forwarding table. If the ingress label of the packet to be forwarded is not found in a certain time slice, M−1 time periods are waited, and the label forwarding tables of other time slices have been determined. At this moment, the ingress label may be searched in the label forwarding tables.

The present application relates to space-air-ground integrated network architecture. The space-air-ground integrated network architecture is one of the core directions of the sixth Generation (6G), and is listed as one of the seven key network requirements by the International Telecommunication Union (ITU). The space-air-ground integrated network architecture of the 6G will realize full coverage of sea, land, and air through deep integration of various heterogeneous networks and will bring new opportunities to markets such as ocean markets, airborne markets, transnational markets, and air-ground fusion markets in combination of the characteristics of wide coverage, flexible deployment, and efficient broadcasting of broadband satellite communication on the basis of ground cellular mobile networks. A space-air-ground integrated network is formed by interconnection and interworking of a space-based information network, the terrestrial Internet, and a mobile communication network.

The space-based information network consists of a series of high, medium, and low orbit satellites, and realizes inter-satellite communication by using an inter-satellite data link between satellites. The present application may be applied to the space-air-ground integrated network, and in particular, to a router/switch of a low orbit satellite constellation with the inter-satellite data link. In the present application, after the division of discrete topology based on a time slice algorithm (each time slot is a time slice), a controller will calculate the topological path in each time slice to generate a label forwarding path (Multi-Protocol Label Switching (MPLS) and Segment Routing-MPLS (SR-MPLS)) in each topology: The present application defines a new type of satellite labels, that is, a time slice attribute (or called a topology attribute) is added to a common label format. From which time slice/topology a label flow is transmitted can be known through a time slice identifier ID/topology identifier ID in the label. As shown in FIG. 2, the satellite label has five domains in total.

Topology number: 8 bits, which identifies the number of discrete topology and also the number of the time slice. The 8 bit here is a recommended value, which may be customized according to the scale of the time slice.

Label value: 12 bits, which identifies the number of the label in the current topology.

EXP: 3 bits, which may support the Quality of Service (Qos).

S: a stack bottom identifier. MPLS supports a plurality of layers of labels, that is, label nesting. When the value of S is 1, it indicates a label of a bottommost layer.

TLT: 8 bits, which is used for indicating the maximum number of network segments allowed to pass through before an Internet Protocol (IP) packet is discarded by a router.

When a satellite receives a label packet, whether a label (a target label) in the packet is a common label or a satellite label needs to be distinguished. Therefore, a special label (a first label) needs to be added in front of the satellite label. For example, a label value may be 15. This label has no difference in the format from a common label, and is used for indicating that the satellite knows that it is a special satellite label when processing the label packet. FIG. 3 is a schematic diagram.

Figures 5, 6:
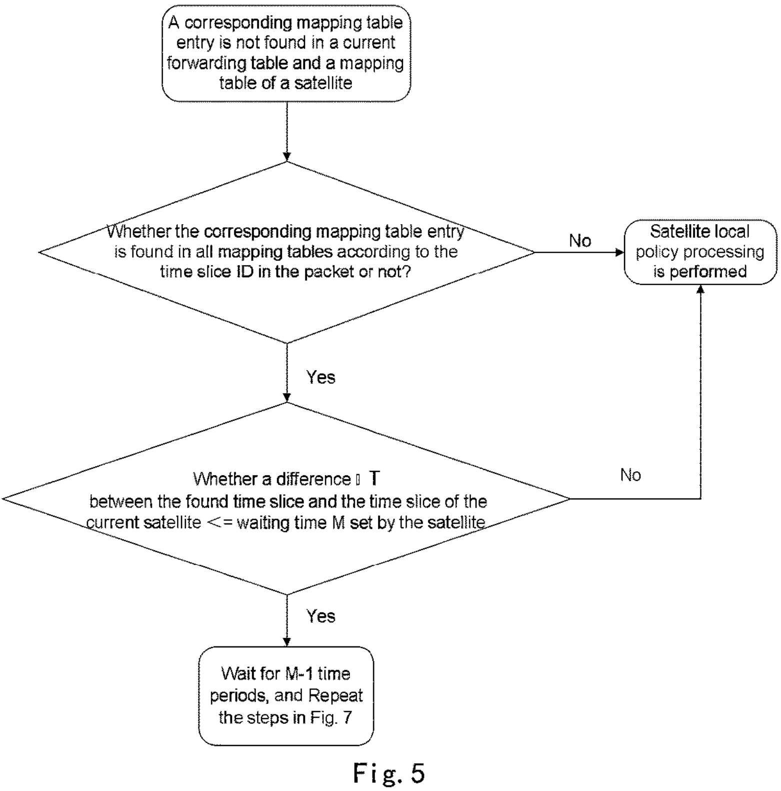
FIG. 5 is a flowchart of a packet forwarding method according to an embodiment of the present disclosure.
FIG. 6 is a mapping diagram of a packet forwarding method according to an embodiment of the present disclosure.

FIG. 4 and FIG. 5 are flowcharts of the present disclosure.

The controller will map the label forwarding tables in all time slices (corresponding to a discrete topology) in pairs, that is, perform one-to-one mapping on label 2001 of a time slice T2 and labels of time slices T1, T3, . . . , Tn. FIG. 6 is a mapping table of the time slice T2 and the time slice T1. Herein, 02:2000 represents an ingress label distributed by a satellite packet forwarding device in the time slice T2. When a packet carrying label 01:510 transmitted from a source node in the time slice T1 reaches the satellite, a previous approach is to directly search for the label forwarding table of the current time slice, that is, the time slice T2. The packet is discarded if it is found that the label forwarding table of the current time slice, that is, the time slice T2, cannot be found, or an incorrect egress label is found, which results in that the packet is transmitted to an error satellite network node, and ultimately results in an uncontrollable security problem. In the present application, whether the time when the packet is transmitted from the source node belongs to the current time slice is determined by viewing a time slice attribute of a label header. If the time when the packet is transmitted from the source node belongs to the current time slice, the label forwarding table of the current time slice is directly searched. If the time when the packet is transmitted from the source node does not belong to the current time slice, a topological mapping table of the time slice T2 is viewed to find a corresponding egress label to perform subsequent forwarding. If corresponding egress label information is not found, the present application further provides a holding policy: that is, according to a hold time policy made in advance, for example, time cycle M, M=N satellite cycles or N satellite time slices (M>=0, N>=0), whether there is a time slice in the mapping table is searched according to a time slice ID1 of the packet at this moment to find a corresponding time slice ID2. If ID2<=M, M−1 cycles are waited. At this moment, the satellite has run to an Mth cycle, the time slice ID2 that appears can be found according to the time slice ID1 of the packet. If the ID2 in the corresponding time slice cannot be found, the forwarding is ended.

Figures 7, 8:
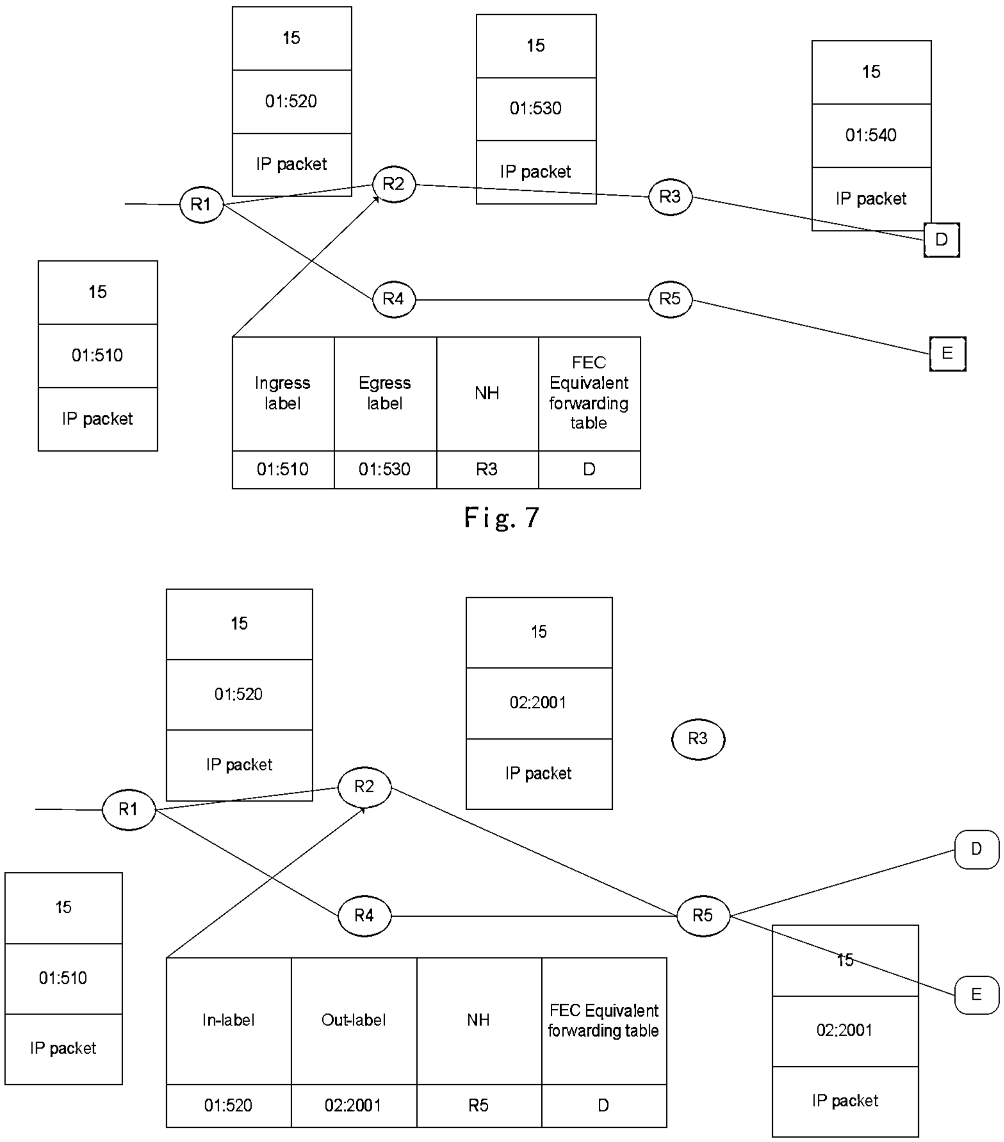
FIG. 7 is a topology diagram of a packet forwarding method according to an embodiment of the present disclosure.
FIG. 8 is a topology diagram of a packet forwarding method according to an embodiment of the present disclosure.

An MPLS label forwarding process on the satellite is described by taking an example in which the packet belongs to the same time slice after arrival. There is no network topology switching occurred in the whole process of packet forwarding, as shown in FIG. 7.

(1) Packet data starts from a satellite router R1 and is transmitted to a destination address satellite D. Before transmitting the packet, a label forwarding table and a label mapping table on the satellite have been calculated on a controller and uploaded to the satellite.

(2) Therefore, after service traffic is imported to satellite R1, and a destination is found to be the satellite D, modified label 01:510 is labeled on the packet (the time slice of the satellite R1 at this moment is T1), meanwhile, a specially indicated satellite label 15 is added to a label stack top, and the label stack top is transmitted to a next hop of satellite R2.

(3) After receiving the label packet, the satellite R2 first checks a stack top label and finds that it is 15, then knows that a subsequent label is a satellite label, searches for the next satellite label after peeling off the label 15, and finds that it belongs to the time slice T1.

(4) A label forwarding table on the R2 is searched to find that a corresponding egress label is 01:520, and it is labeled with a special label 15 after being switched, and then is continued to be transmitted to a next hop of satellite node R3.

(5) After R3 receives the label, an operation of (4) is repeated, the label is switched to a label 01:540, is labeled with a special label 15, and is transmitted to the satellite D.

(6) After the satellite D receives the packet and finds that a packet destination is itself, then the forwarding is ended up.

A modified MPLS label forwarding process is described by taking an example in which the time slice after the arrival of the packet is inconsistent. Network topology switching is occurred in a process of forwarding the packet from a source node to a destination node hop by hop. as shown in FIG. 8.

(1) Packet data starts from a satellite router R1 and is transmitted to a destination address satellite D. Before transmitting the packet, a label forwarding table and a label mapping table on the satellite have been calculated on a controller and uploaded to the satellite.

(2) Therefore, after service traffic is imported to the satellite R1, and a destination is found to be the satellite D, modified label 01:510 is labeled on the packet (the time slice of the satellite R1 at this moment is T1), meanwhile, a specially indicated satellite label 15 is added to a label stack top, and the label stack top is transmitted to a next hop of satellite R2.

(3) After the packet arrives at the satellite R2, the satellite R2 checks a stack top label and finds that it is 15, then knows that a subsequent label is a satellite label, searches for the next satellite label after peeling off the label 15, and finds that it is T1, at this moment, the time slice of the R2 is switched to T2. The mapping table rather than the label forwarding table of the R2 at the time slice T2 needs to be searched. It is found that 01:510 corresponds to 02:2001 of the time slice T2, and a label is switched, is labeled with a special label 15, and then is continued to be transmitted to a next hop of R5.

(4) After satellite R5 receives the packet, actions of (3) are repeated, and the packet is transmitted to a next hop of satellite D.

(5) After the satellite D receives the packet and finds that a packet destination is itself, then the forwarding is ended up.

Figures 9, 10:
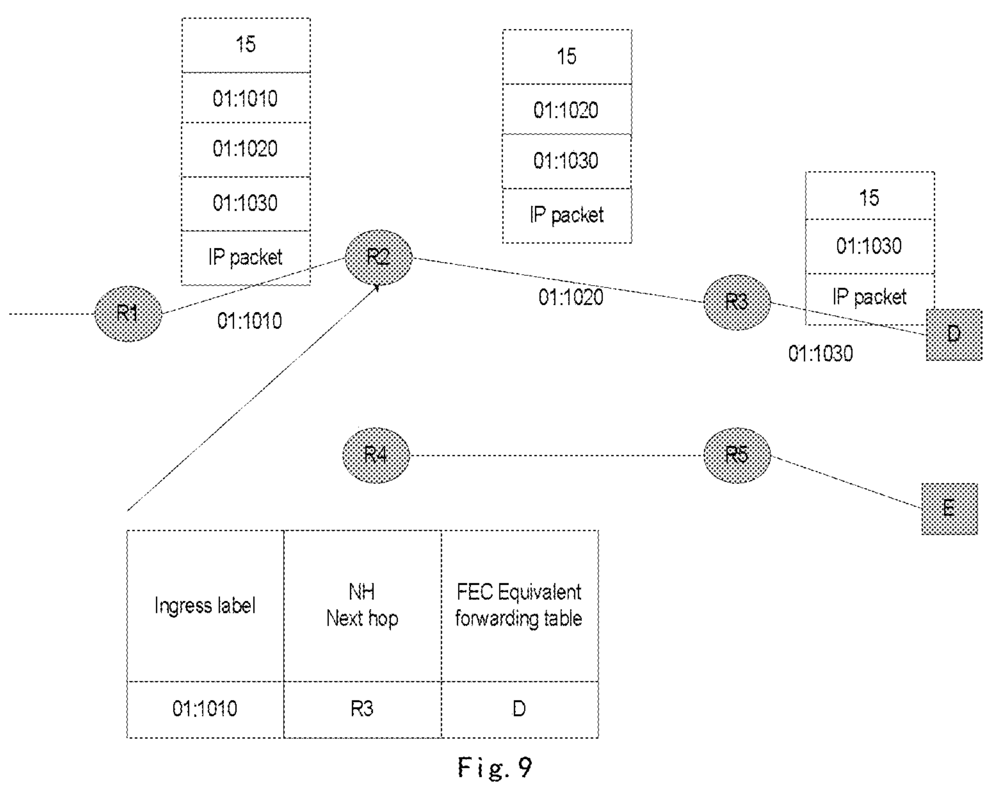
FIG. 9 is a topology diagram of a packet forwarding method according to an embodiment of the present disclosure.
FIG. 10 is a topology diagram of a packet forwarding method according to an embodiment of the present disclosure.

An example for an SR-MPLS label type is as shown in FIG. 9.

(1) Data packet starts from a satellite router R1 and is transmitted to a destination address satellite D. Before transmitting the packet, a label forwarding table and a label mapping table on the satellite have been calculated on a controller and uploaded to the satellite.

(2) Therefore, after service traffic is imported to satellite R1, and a destination is found to be the satellite D, it is found that a path list (15, 01:1010, 01:1020, 01:1030) can be taken. After being labeled with a label list, an IP packet header is transmitted to a next hop of satellite R2.

(3) After receiving the label packet, the satellite R2 first checks a stack top label and finds that it is 15, then knows that a subsequent label is a satellite label, searches for the next satellite label and finds that it is T1.

(4) A label forwarding table on the R2 is searched to find an egress interface and a next hop, and after a label pops up, the label is continued to be transmitted to a next hop of satellite node R3.

(5) After the R3 receives the label, an operation of (4) is repeated, a label 01:1020 pops up and is transmitted to the destination satellite D.

(6) After the satellite D receives the packet and finds that a packet destination is itself, then the forwarding is ended up.

A modified SR-MPLS label forwarding process is described by taking an example in which the time slice after the arrival of the packet is inconsistent. Network topology switching is occurred in a process of forwarding the packet from a source node to a destination node hop by hop. as shown in FIG. 10.

(1) Packet data starts from a satellite router R1 and is transmitted to a destination address satellite D. Before transmitting the packet, a label forwarding table and a label mapping table on the satellite have been calculated on a controller and uploaded to the satellite.

(2) Therefore, after service traffic is imported to satellite R1, and a destination is found to be the satellite D, it is found that a path list (15, 01:1010, 01:1020, 01:1030) can be taken. After being labeled with a label list, an IP packet header is transmitted to a next hop of satellite R2.

(3) After receiving the label packet, the satellite R2 first checks a stack top label and finds that it is 15, then knows that a subsequent label is a satellite label, searches for the next satellite label and finds that it is T1.

(4) At this moment, the time slice of the R2 has been switched to T2. A time slice ID in the packet label is searched, and it is found that the time slice is the time slice T1. at this moment, a mapping table rather than a label forwarding table of the R2 at the time slice T2 needs to be searched. It is found that 01:1010 corresponds to (15, 02:2020, 02:2030) of the time slice T2. At this moment, a label switching action needs to be performed, and a label is switched and is continued to be transmitted to next hop of R5.

(5) After the R3 receives the label, an operation of (4) is repeated, a label 02:2020 pops up and is transmitted to the destination satellite D.

(6) After the satellite D receives the packet, labels 15 and 02:2030 pop up, and the satellite D finds that a packet destination is itself, then the forwarding is ended up.

Through the description of the above implementations, those skilled in the art can clearly understand that the method of the embodiments may be implemented by means of software and a necessary general hardware platform, and of course, may also be implemented through hardware, but in many cases, the former one is a better implementation.

Based on such an understanding, the technical solutions of the present disclosure essentially or a part thereof that contributes to the related technologies may be embodied in a form of a software product. The computer software product is stored in a storage medium (for example, a Read-Only Memory (ROM)/a Random Access Memory (RAM), a magnetic disk, or a compact disc), and includes a plurality of instructions for instructing a terminal device (which may be a mobile phone, a computer, a server, network device, or the like) to perform the methods of various embodiments of the present disclosure.

In the present embodiment, a packet forwarding apparatus is further provided. The apparatus is configured to implement the above embodiments and preferred implementations, and those have not been described will not be elaborated. As used below; the term "module" may implement a combination of software and/or hardware with a predetermined function. Although the apparatus described in the following embodiments is preferably implemented in software, hardware or a combination of software and hardware may also possible and be contemplated.

Figure 11:
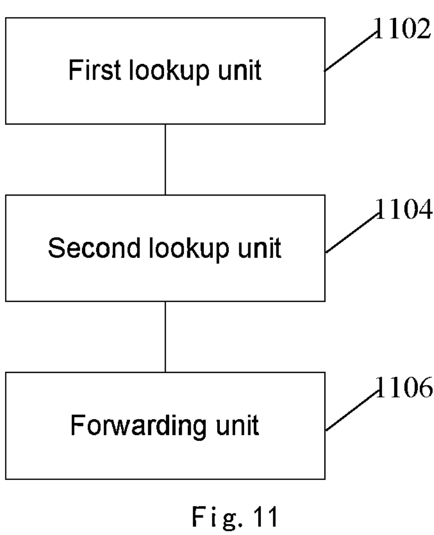
FIG. 11 is a structural block diagram of a packet forwarding apparatus according to an embodiment of the present disclosure.

FIG. 11 is a structural block diagram of a packet forwarding apparatus according to an embodiment of the present disclosure. As shown in FIG. 11, the apparatus includes a first lookup unit 1102, a second lookup unit 1104, and a forwarding unit 1106.

The first lookup unit 1102 is configured to search for an ingress label of a packet to be forwarded in a current label forwarding table corresponding to a current time slice or current topology in a case that the packet to be forwarded is acquired.

The second lookup unit 1104 is configured to search for the ingress label in a target label forwarding table corresponding to a target time slice or target topology in a case that the ingress label is not found in the current label forwarding table.

The forwarding unit 1106 is configured to forward the packet to be forwarded according to an egress label corresponding to the ingress label in the target label forwarding table in a case that the ingress label is found in the target time slice.

For other examples of the present embodiment, please refer to the above examples, which will not be elaborated herein.

It is to be noted that each of the modules above may be implemented by software or hardware. For the latter one, it may be implemented by, but not limited to, the following manners: the above modules are all located in the same processor: or, the above modules are respectively located in different processors in any combination form.

The embodiments of the present disclosure further provide a computer-readable storage medium. The computer-readable storage medium stores a computer program. The computer program is configured to perform the steps in any one of the above embodiments when running.

In one exemplary embodiment, the above computer-readable storage medium may include, but is not limited to, various media capable of storing a computer program, such as a USB flash disc, a ROM, a RAM, a mobile hard disc, a magnetic disc, or a compact disc.

The embodiments of the present disclosure further provide an electronic apparatus, including a memory and a processor. The memory stores a computer program. The processor is configured to run the computer program to perform the steps in any one of the above method embodiments.

In one exemplary embodiment, the above electronic apparatus may further include a transmission device and an input/output device. The transmission device is connected to the above processor. The input/output device is connected to the above processor.

A specific example in the present embodiment may refer to the examples described in the above embodiments and exemplary implementations, which will not be elaborated herein in the present embodiment.

Apparently, those skilled in the art understand that the above various modules or various steps in the present disclosure may be implemented by using a general computing apparatus. They may be centralized on a single computing apparatus or may be distributed on a network composed of a plurality of computing apparatuses. They may be implemented by using executable program code of a computing apparatus. Thus, they may be stored in a storage apparatus and executed by the computing apparatus. Moreover, in certain cases, the shown or described steps may be executed in a sequence different from this sequence, or they are manufactured into various integrated circuit modules respectively, or a plurality of modules or steps therein are manufactured into a single integrated circuit module. Therefore, the present disclosure is not limited to any specific combination of hardware and software.

The above is only preferred embodiments of the present disclosure, and is not intended to limit the present disclosure. For those skilled in the art, the present disclosure may have various modifications and variations. Any modification, equivalent replacement, improvement and the like made within the principle of the present disclosure shall fall within the protection scope of the present disclosure.

What is claimed is:

1. A packet forwarding method, comprising:

looking up an ingress label of a packet to be forwarded in a current label forwarding table corresponding to a current time slice or current topology in a case that the packet to be forwarded is acquired;

looking up the ingress label in a target label forwarding table corresponding to a target time slice or target topology in a case that the ingress label is not found in the current label forwarding table; and forwarding the packet to be forwarded according to an egress label corresponding to the ingress label in the target label forwarding table in a case that the ingress label is found in the target label forwarding table;

before acquiring a packet to be forwarded, further comprising:

calculating a topological path corresponding to each time slice, all time slices having a mapping relationship, and each time slice corresponding to one topological path; and obtaining a label forwarding path corresponding to each time slice according to the topological path.

2. A non-transitory computer-readable storage medium, storing a computer program, wherein the computer-readable storage medium is configured to, when executed by a processor, implement steps of the method according to claim 1.

3. The method according to claim 1, wherein looking up an ingress label of a packet to be forwarded in a current label forwarding table corresponding to a current time slice or current topology in a case that the packet to be forwarded is acquired:

parsing a target label of the packet to be forwarded;

determining the packet to be forwarded as a common packet or a satellite packet according to the target label of the packet to be forwarded; and looking up the ingress label from the current label forwarding table in a case that the packet to be forwarded is the satellite packet.

4. The method according to claim 3, before parsing a target label of the packet to be forwarded, further comprising:

determining that the packet to be forwarded comprises the target label in a case that a first packet is obtained by parsing the packet to be forwarded; and determining that the packet to be forwarded does not comprise the target label in a case that the first packet is not obtained by parsing the packet to be forwarded.

5. The method according to claim 1, wherein the looking up the ingress label in a target label forwarding table corresponding to a target time slice in a case that the ingress label is not found in the current label forwarding table comprises:

waiting for M−1 time periods in a case that the target time slice is not found, each time period being a time slice, and M being the number of time slices in a cycle;

looking up the target time slice after waiting for M−1 time periods;

looking up the ingress label in the target label forwarding table in a case that the target time slice is found; and ending up forwarding of the packet to be forwarded in a case that the target time slice is not found.

6. A non-transitory computer-readable storage medium, storing a computer program, wherein the computer-readable storage medium is configured to, when executed by a processor, implement steps of the method according to claim 4.

7. An electronic apparatus, comprising a memory, a processor, and a computer program stored in the memory and capable of running on the processor, wherein the processor is configured to, when executing the computer program, implement steps of the method according to claim 4.

8. An electronic apparatus, comprising a memory, a processor, and a computer program stored in the memory and capable of running on the processor, wherein the processor is configured to, when executing the computer program, implement steps of the method according to claim 3.

9. A non-transitory computer-readable storage medium, storing a computer program, wherein the computer-readable storage medium is configured to, when executed by a processor, implement steps of the method according to claim 3.

10. An electronic apparatus, comprising a memory, a processor, and a computer program stored in the memory and capable of running on the processor, wherein the processor is configured to, when executing the computer program, implement steps of the method according to claim 5.

11. A non-transitory computer-readable storage medium, storing a computer program, wherein the computer-readable storage medium is configured to, when executed by a processor, implement steps of the method according to claim 5.

12. An electronic apparatus, comprising a memory, a processor, and a computer program stored in the memory and capable of running on the processor, wherein the processor is configured to, when executing the computer program, implement steps of the method according to claim 1.

13. A packet forwarding apparatus, comprising:

a first lookup unit, configured to look up an ingress label of a packet to be forwarded in a current label forwarding table corresponding to a current time slice or current topology in a case that the packet to be forwarded is acquired;

a second lookup unit, configured to look up the ingress label in a target label forwarding table corresponding to a target time slice or target topology in a case that the ingress label is not found in the current label forwarding table; and a forwarding unit, configured to forward the packet to be forwarded according to an egress label corresponding to the ingress label in the target label forwarding table in a case that the ingress label is found in the target label forwarding table;

a calculation unit, configured to calculate a topological path corresponding to each time slice before acquiring the packet to be forwarded, all time slices having a mapping relationship, and each time slice corresponding to one topological path; and a determination unit, configured to obtain a label forwarding path corresponding to each time slice according to the topological path.

14. The apparatus according to claim 13, wherein the first lookup unit comprises:

a parsing module, configured to parse a target label of the packet to be forwarded;

a first determination module, configured to determine the packet to be forwarded as a common packet or a satellite packet according to the target label of the packet to be forwarded; and a lookup module, configured to look up the ingress label in the current label forwarding table in a case that the packet to be forwarded is the satellite packet.

15. The apparatus according to claim 14, wherein the first lookup unit further comprises:

a second determination module, configured to determine that the packet to be forwarded comprises the target label in a case that a first packet is obtained by parsing the packet to be forwarded; and a third determination module, configured to determine that the packet to be forwarded does not comprise the target label in a case that the first packet is not obtained by parsing the packet to be forwarded.

16. The apparatus according to claim 13, wherein the second lookup unit comprises:

a processing module, configured to: wait for M−1 time periods in a case that the target time slice is not found, each time period being a time slice, and M being the number of time slices in a cycle; look up the target time slice after waiting for M−1 time periods; look up the ingress label in the target label forwarding table in a case that the target time slice is found; and end up forwarding the packet to be forwarded in a case that the target time slice is not found.

* * * * *